(12) United States Patent
Rudlof et al.

(10) Patent No.: US 11,760,287 B2
(45) Date of Patent: Sep. 19, 2023

(54) ENERGY ABSORPTION COMPONENT FOR A MOTOR VEHICLE AND ENERGY ABSORPTION ELEMENT AND STRENGTHENING ELEMENT THEREFOR

(71) Applicant: Daimler AG, Stuttgart (DE)

(72) Inventors: Volker Rudlof, Rangendingen (DE); Michael Carl, Gerlingen (DE)

(73) Assignee: Daimler AG, Stuttgart (DE)

( * ) Notice: Subject to any disclaimer, the term of this patent is extended or adjusted under 35 U.S.C. 154(b) by 335 days.

(21) Appl. No.: 17/292,939

(22) PCT Filed: Oct. 7, 2019

(86) PCT No.: PCT/EP2019/077127
§ 371 (c)(1),
(2) Date: May 11, 2021

(87) PCT Pub. No.: WO2020/099028
PCT Pub. Date: May 22, 2020

(65) Prior Publication Data
US 2022/0001818 A1 Jan. 6, 2022

(30) Foreign Application Priority Data

Nov. 12, 2018 (DE) ...................... 10 2018 008 894.5

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01); *B60R 2019/186* (2013.01)

(58) Field of Classification Search
CPC .... B60R 19/34; B60R 19/18; B60R 2019/186
See application file for complete search history.

(56) References Cited

U.S. PATENT DOCUMENTS 11,027,682 B2 * 6/2021 Sotoyama ............ B62D 21/152

FOREIGN PATENT DOCUMENTS

| CN | 106080471 A | 11/2016 |
|---|---|---|
| DE | 10 2004 014 047 A1 | 10/2005 |

(Continued)

OTHER PUBLICATIONS

PCT/EP2019/077127, International Search Report dated Dec. 13, 2019 (Three (3) pages).

(Continued)

*Primary Examiner* — Dennis H Pedder
*Assistant Examiner* — Melissa Ann Bonifazi
(74) *Attorney, Agent, or Firm* — Crowell & Moring LLP

(57) ABSTRACT

An energy absorption component for a motor vehicle includes an energy absorption element that has a longitudinal element with first and second support regions that support the longitudinal element on a bumper crossmember of the motor vehicle and on a shell construction element of the motor vehicle, respectively. A strengthening element is disposed on an outside of the longitudinal element and has first and second support regions that support the strengthening element on the bumper crossmember and on the shell construction element, respectively. An end of the first support region of the strengthening element is disposed apart from an end of the first support region of the longitudinal element by a first distance and an end of the second support region of the strengthening element is disposed apart from an end of the second support region of the longitudinal element by a second distance.

7 Claims, 4 Drawing Sheets

(56) References Cited

FOREIGN PATENT DOCUMENTS

| DE | 10 2006 019 653 B4 | 11/2006 | | |
|----|---|---|---|---|
| DE | 10 2014 017 447 A1 | 6/2015 | | |
| DE | 10 2015 200 359 B4 | 7/2016 | | |
| DE | 10 2015 117 005 A1 | 4/2017 | | |
| DE | 102020214189 A1 * | 5/2022 | | |
| JP | 51-77746 U | 6/1976 | | |
| JP | 2000-62551 A | 2/2000 | | |
| JP | 2013-169875 A | 9/2013 | | |
| JP | 7035908 B2 * | 3/2022 | ............ | B60R 19/34 |
| WO | WO-2021091514 A1 * | 5/2021 | ............ | B60R 19/34 |

OTHER PUBLICATIONS

German-language German Office Action issued in German application No. 10 2018 008 894.5 dated Oct. 2, 2019 (Six (6) pages).

* cited by examiner

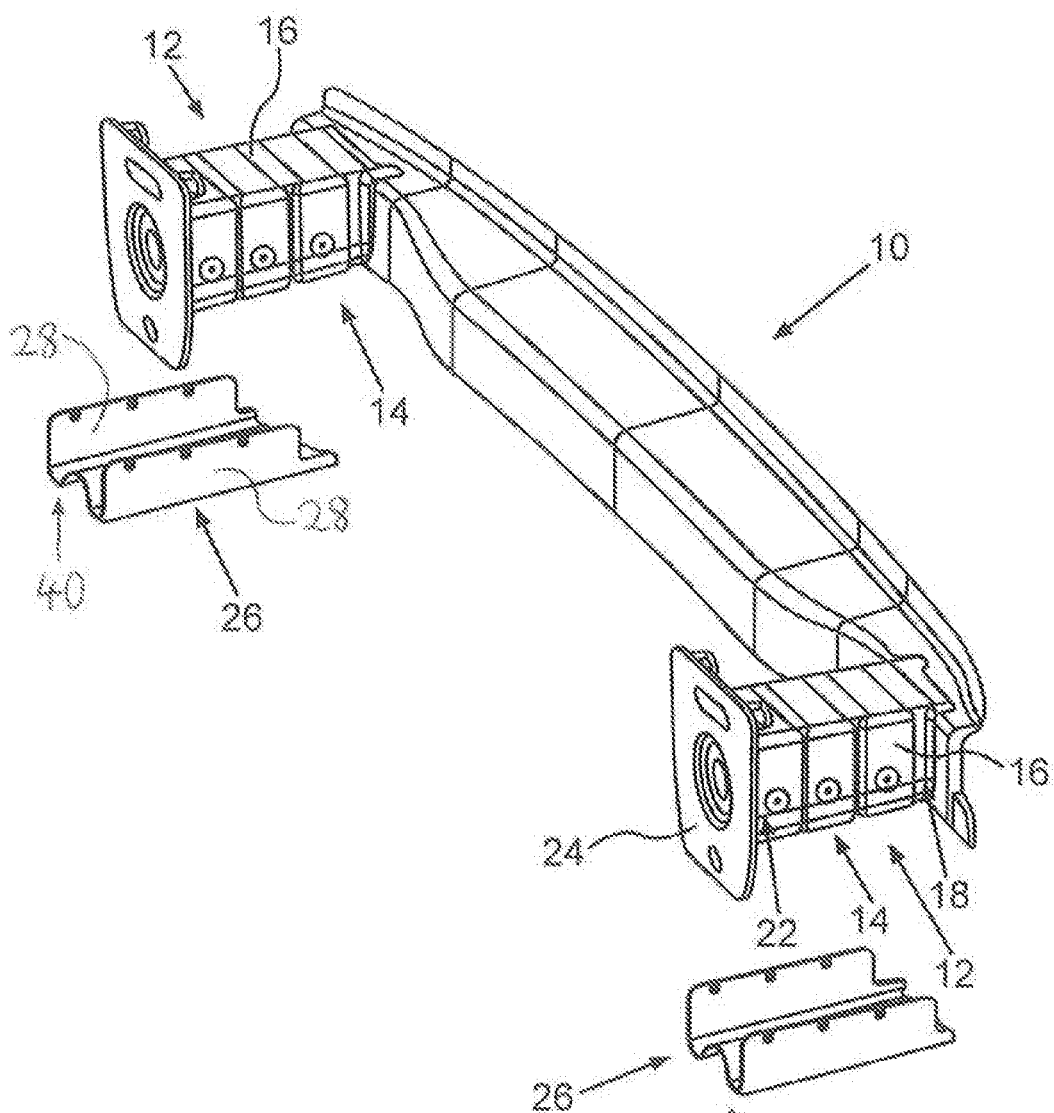
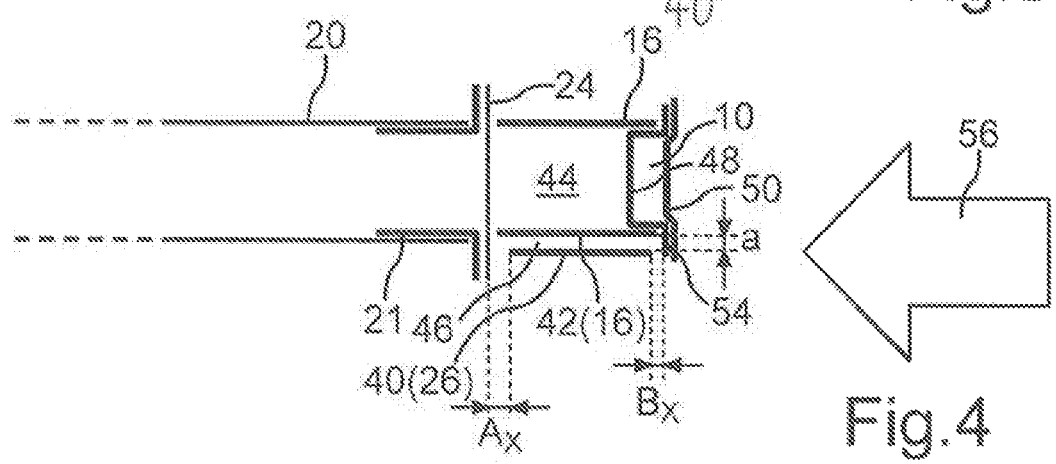
Fig.3
Fig.4

ENERGY ABSORPTION COMPONENT FOR A MOTOR VEHICLE AND ENERGY ABSORPTION ELEMENT AND STRENGTHENING ELEMENT THEREFOR

BACKGROUND AND SUMMARY OF THE INVENTION

The invention relates to an energy absorption component for a motor vehicle. Furthermore, the invention relates to an energy absorption element and a strengthening element for such an energy absorption component.

The trend for creating vehicle derivatives within one or more vehicle classes has been introduced into serial automotive construction of passenger vehicles. Along with classical saloon cars, coupés, convertibles, SUVs, vans and other models are usually offered here as part of one vehicle series. Here, it is desirable, on the one hand, to use as many of the same parts as possible in the respective shell structures of the various derivatives, yet on the other hand to also provide vehicles with as different vehicle dimensions and vehicle weights as possible.

A particular problem emerges as a result of various wheel and axis variants in terms of vehicle stand heights, which can obviously be very different, for example with sporty convertibles and SUVs in one vehicle series.

Here, the different vehicle stand heights in turn lead to different elevations of certain structural components of the vehicle structure, which have to be activated, for example in the event of a collision of the vehicle by forming corresponding load paths. One of these component ranges of the vehicle structure is, for example, the structural components of the main longitudinal support plane in the region of the rear of the vehicle, on which a flexible girder structure of the rear bumper is usually supported. Here, a flexible crossmember running in the transverse direction of the vehicle and horizontally is usually provided, which is supported on the main longitudinal supports of the vehicle structure by the intermediation of respective energy absorption elements, so-called crash boxes.

Because of the different vehicle stand heights or the different elevations of structural components of the vehicle structure associated with these, in the present case in particular the varying elevations of the main longitudinal supports, it thus results in a different height position of the flexible girder structure.

In particular with rear end collision to vehicles with high vehicle stand heights, here because of minimal or even no overlap with a crash barrier, i.e., for example with an accident partner or an obstacle, it can result in the flexible support structure being completely or partially passed below and acting at least not completely in the desired manner, which, for example, leads to increased intrusions in the region of the rear of the vehicle when other, sometimes incredibly expensive, precautionary measures are not taken. Here, it can result, in particular, in a rotation of the flexible support structure around an axis running in the transverse direction of the vehicle, which can lead to the failures in the region of the rear of the vehicle.

In order to avoid such failures, it is already known from DE 10 2006 019 653 B4 to provide an energy absorption element for supporting the respective flexible crossmember, which comprises a longitudinal element in the form of an extruded profile having several cavities. The extruded profile here has respective support regions for supporting on sides of the bumper crossmember, on the one hand, and on sides of the shell construction structural element, on the other hand. Moreover, this energy absorption component comprises a strengthening element in the form of a length of pipe that is rectangular in cross-section, which is plugged into one of the cavities of the extruded profile and, in doing so, strengthens the energy absorption element.

Furthermore, it is already known from DE 10 2004 014 047 A1 to form respective energy absorption elements or crash boxes of a flexible support structure sloped backwards and rising upwards, in order to thus position the bumper crossmember more highly.

The object of the present invention is to create an energy absorption component for a motor vehicle and an energy absorption element and a strengthening element for such an energy absorption component, by means of which a highly effective, improved absorption of impact forces, which are introduced into the respective energy absorption component via bumper crossmembers, is to be easily and cheaply created.

The energy absorption component according to the invention for a motor vehicle comprises an energy absorption element having a longitudinal element, which comprises respective support regions for supporting on sides of a bumper crossmember and on sides of a shell construction structural element. Moreover, the energy absorption component comprises a strengthening element, by means of which the energy absorption element is strengthened. In order to now achieve that, in particular with motor vehicles with a high vehicle stand height with a force supply causing an accident with a crash barrier and a collision accompanied by it, in which the bumper crossmember, for example, and the barrier do not overlap or do not completely overlap in terms of their height extension, the strengthening element is, according to the invention, arranged on the outside of the longitudinal element and is spaced apart, with respective support regions provided on its ends, from the corresponding support regions of the longitudinal element in such a way that an additional support can be achieved by means of the strengthening element, such that it can result, for example, in no excessive rotation or in an excessive buckling or similar deformation in the region of the energy absorption element. As a result of the strengthening element arranged on the outside at a distance apart from the longitudinal element of the energy absorption element, an additional moment receiver is thus created, by means of which a moment, which emerges, in particular, as a result of an at least incomplete overlap of a barrier or an obstacle with the bumper crossmember, is advantageously received. If a bumper crossmember, for example, is thus completely or partially passed under, then a moment thus introduced, in particular, into the energy absorption element can be advantageously received or supported by the strengthening element. The strengthening element is here arranged, in particular, in the region and at a distance below the allocated longitudinal element of the energy absorption element.

As a result of its fastening on the outside, the strengthening element according to the invention here has the great advantage that it can only be used in motor vehicles having a correspondingly high vehicle stand height, for example. Thus, as a result of the present energy absorption element component, a modular solution is created in which a coherent energy absorption element and a coherent longitudinal element, for example, can be used, and in which, depending on the construction variant of the respective vehicle within a whole vehicle series, the corresponding energy absorption component is fitted or not with a strengthening element. Thus, for example, vehicles are also fitted with a third row of seats, in particular, or with an electric drive or with high voltage components with the strengthening element if this is conducive to safety, whereas with vehicles that have favourable crash behaviour in any case because of their smaller vehicle stand height, for example, such measures can be dispensed with in order to save weight and costs.

The additional component in the form of the strengthening element moreover provides for as high a force absorption as possible of the respective energy absorption elements and the shell structures lying below them, in particular longitudinal girder structures in the axial direction, and creates an additional multi-chamber structure for increasing the energy absorption. The present energy absorption component can here be used both in the region of the rear of the vehicle and in the region of the front of the vehicle of a motor vehicle.

In a further design of the invention, it has been shown to be advantageous when the strengthening element has at least one leg, via which it is connected to the longitudinal element of the energy absorption element. In contrast, in a particularly advantageous design of the invention, the strengthening element has a U-shaped cross-section, at least over a longitudinal region, with two respective legs, via which the strengthening element is connected to the longitudinal element of the energy absorption element. The legs described here contribute particularly advantageously to the energy absorption and can be adjusted by a suitable design in such a way that corresponding energy absorption capabilities can be achieved. Thus, ribbing, indentations or similar can be used, for example, in order to adjust the strengthening element.

A further advantageous embodiment of the invention provides that the strengthening element is supported with its support region on sides of the bumper crossmember directly on this and ends with its support region on sides of the shell construction element, in particular on sides of the respective longitudinal girder structure, at a distance apart from a counter element, for example from a holding plate of the energy absorption element. As a result of the direct support on sides of the bumper crossmember, the forces introduced into the bumper crossmember can be absorbed here as early as possible. As a result of the spacing between the support region on sides of the shell construction element and the corresponding counter element, for example the holding plate, the side of the crossmember of the bumper crossmember structure supplied first is supported, in particular in the event of a crash, against a twisting otherwise resulting from an unfavourable overlap ratio between the bumper crossmember and a barrier, and thus the force introduction is introduced as early as possible axially into the counter element on the shell construction side, wherein the size and direction of the force introduced can be adjusted by means of the adjustable distance between support regions of the strengthening element on sides of the shell construction element and the corresponding counter element, whereby the whole deformation of the passenger cabin is reduced in the longitudinal direction of the vehicle and in the vertical direction of the vehicle because of the lower inclination for twisting or buckling of the shell construction elements.

Finally, it has furthermore been shown to be advantageous if the bumper crossmember can be supported in the vicinity of its lower end, in particular a flange, by means of the allocated support region of the strengthening element. In doing so, rotational forces emerging as a result of the minimal overlap between the bumper crossmember and barrier can be absorbed again in an improved manner.

The advantages described above in the context of the energy absorption component according to the invention apply in the same way to the energy absorption element. This is characterized, in particular, by respective fixing elements to which the strengthening element can be fixed. In doing so, the energy absorption element can be used both on its own and in combination with the strengthening element for the energy absorption component according to the invention and thus, in a particularly advantageous manner, can be part of a construction box system in which, depending on the vehicle of a certain vehicle series, in particular depending on the vehicle stand height, the energy absorption element can be used alone or in combination with the strengthening element.

The advantages described above in the context of the energy absorption component according to the invention or the energy absorption element also apply in the same way to the strengthening element. This preferably also has respective fastening elements, by means of which it can be arranged on the outside of the longitudinal element of the energy absorption element. Thus, the strengthening element is also part of a construction box system and can be used, in particular for moment support, when an energy absorption component is to be created in which a minimal overlap between a bumper crossmember and a corresponding impinging barrier is relatively minimal, and accordingly there is the threat of an over-rotation of the bumper crossmember. Such a rotation can be advantageously prevented by the strengthening element according to the invention.

Further advantages, features and details of the invention emerge from the description below of a preferred exemplary embodiment and by means of the drawings. The features and feature combinations mentioned above in the description and the features and feature combinations mentioned below in the description of the figures and/or shown in the figures alone can be applied not only in the respectively specified combination, but also in other combinations or on their own without leaving the scope of the invention.

BRIEF DESCRIPTION OF THE DRAWINGS

FIG. 3 is a perspective exploded depiction of the bumper crossmember and respective energy absorption elements for supporting on corresponding shell construction elements of the motor vehicle, wherein the respective strengthening elements for strengthening the corresponding energy absorption element or for creating the respective energy absorption components are depicted separately;

FIG. 4 is a schematic side view of the arrangement of the bumper crossmember on a corresponding shell construction element in the form of a rear main longitudinal girder of the motor vehicle by the intermediation of one of the two energy absorption components, which are formed by the corresponding energy absorption element and the corresponding strengthening element;

DETAILED DESCRIPTION OF THE DRAWINGS

Figure 1:
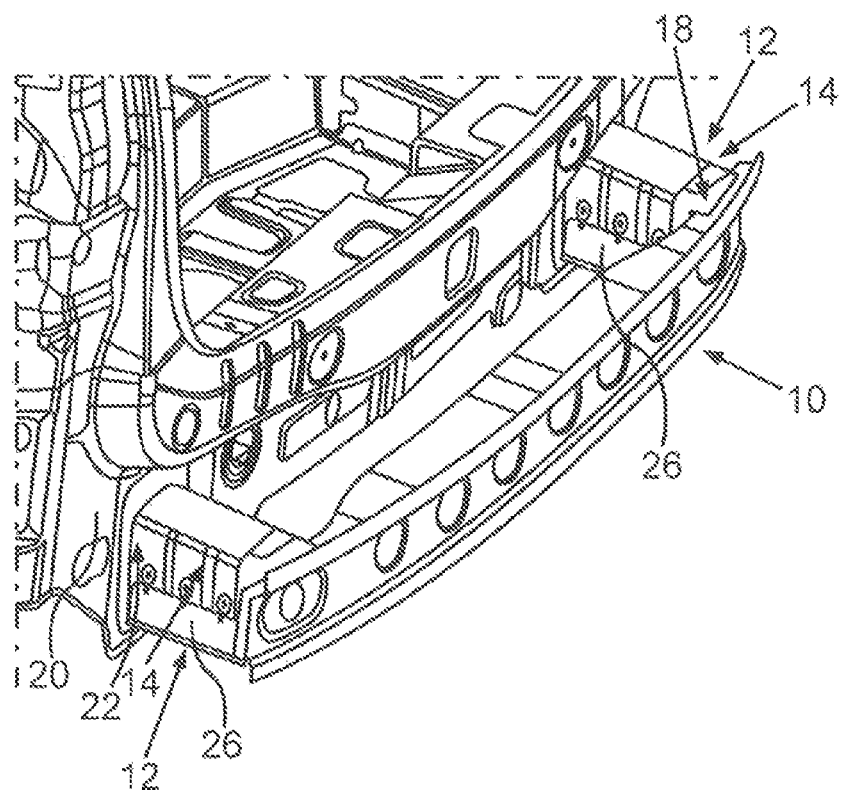
FIG. 1 is a perspective view of the rear region of a passenger vehicle, in which a bumper crossmember is fixed and supported on corresponding shell construction elements of the motor vehicle via two respective energy absorption components, wherein each of the energy absorption components has an energy absorption element and a strengthening element arranged on the underside thereof, which is fixed on the outside of a longitudinal element of the corresponding energy absorption element and is formed to be U-shaped in terms of cross-section at least via a longitudinal region.

In FIG. 1, a motor vehicle rear of a bodywork of a passenger vehicle is depicted in sections in a perspective view. In the present case, it is an SUV or a van, for example, with a correspondingly large vehicle stand height.

Here, a bumper crossmember 10 can be seen in the region of the rear of the vehicle, the bumper crossmember being fixed and supported on the side of the shell construction via two energy absorption components 12 not illustrated in more detail.

Figure 2:
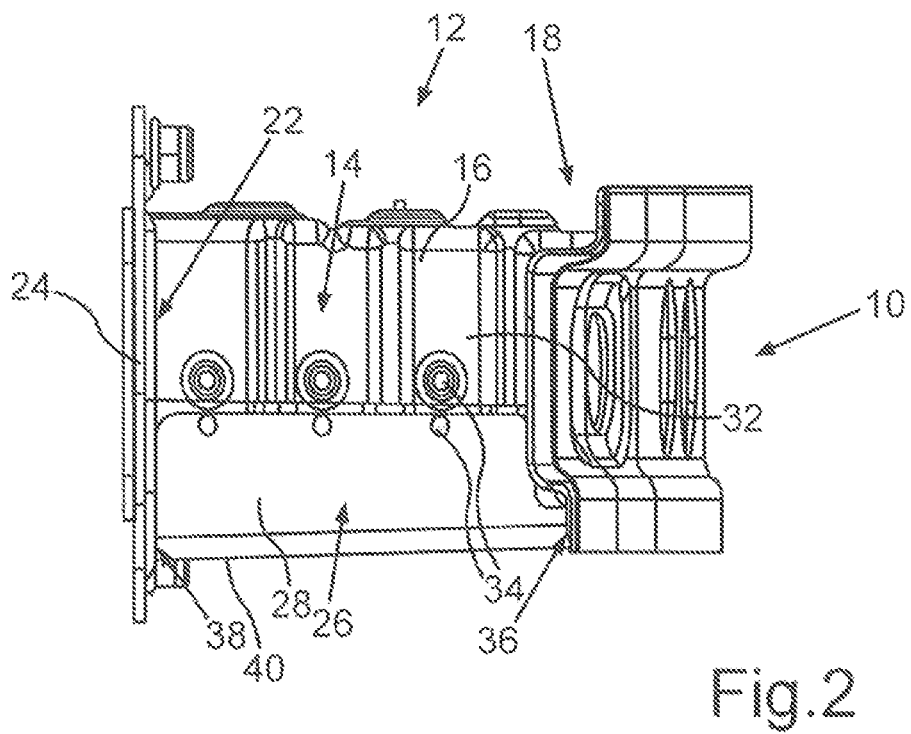
FIG. 2 is a side view of one of the two energy absorption components according to FIG. 1.

When viewing FIGS. 2 and 3 together, the concrete construction of the respective energy absorption component 12 is now to be explained further.

As can initially be seen from FIG. 3 in a corresponding perspective depiction, each of the energy absorption components 12 respectively comprises an energy absorption element 14, which comprises a box-shaped longitudinal element 16 as the central component, which extends at least substantially horizontally and in the longitudinal direction of the vehicle.

As can be seen in particular in FIG. 2 in a side view of the energy absorption component 12, the longitudinal element 16 has a rear support region 18 on sides of the bumper crossmember 10 and a front support region 22 on sides of a shell construction element 20 to be illustrated in more detail further below. Towards the back, the support region 18 of the longitudinal element 16 is directly connected to the bumper crossmember 10, for example by means of a welded connection or similar Towards the front, the connection of the support region 22 of the longitudinal element 16 is carried out with the shell construction element 20 by the intermediation of a counter element 24, which is formed as a screw plate in the present case. In the present case, the longitudinal element 16 is assembled as a box profile made of several sheet scale elements. Yet here, extruded profiles, tubes, casting components or other components, in particular made of corresponding metal alloys, are conceivable. In addition, it is also conceivable to form respective parts from plastic.

As can now be seen from FIG. 3, in particular, each of the energy absorption components 12 also comprises a strengthening element 26, along with the respective energy absorption element 14, the strengthening element being respectively depicted separately in FIG. 3. This strengthening element 26 is presently formed as a sheet scale component with a substantially U-shaped cross-section and comprises respective legs 28, via which the strengthening element 26 can be or is connected to the corresponding longitudinal element 16 of the energy absorption element 14. The legs 28 are here spaced apart from one another in such a way that they abut on the outside of a respectively corresponding outer wall 32 of the respective longitudinal element 16. Here, the strengthening element 26 presently has a plurality of fixing points, fixing elements 34 or similar, via which the strengthening element 26 can be connected to the corresponding longitudinal element 16. Here, various types of fastening are of course conceivable, such as welding, screwing, riveting or similar.

The respective strengthening element 26 comprises a rear support region 36 which—as can be seen, in particular, when viewed together with FIG. 2—is adjusted to the contour course of the bumper crossmember 10 on its side facing towards the strengthening element 26. Here, the support region 36 of the strengthening element 26 abuts at least substantially on the bumper crossmember 10 in the installed state. Here, a large-format support is advantageous.

Furthermore, the strengthening element 26 comprises a front support region 38 which, in the present case, is facing towards the counter element 24 in the form of the screw plate. However, this support region 38 can end at a distance apart $A_x$ from the counter element 24 in the form of the screw plate, wherein the function of the spacing $A_x$ is to be explained in more detail below.

When seen together with FIG. 4, which shows the arrangement of the bumper crossmember 10 extremely schematically on the rear structure of the passenger vehicle by the intermediation of the respective energy absorption component 12, it can be seen that an underside 40 of the strengthening element 26 runs at a distance a apart from a lower wall 42 of the longitudinal element 16 of the corresponding energy absorption element 14. The strengthening element 26 here forms a cavity 46 with the lower wall 42 of the longitudinal element 16, such that overall an energy absorption component 12 having the cavity 46 and a cavity 44—formed by the profile of the longitudinal element 16—is created.

In addition, it is schematically indicated in FIG. 4 that the bumper crossmember 10 is also formed in two parts having a rear component 50 substantially formed as a closure part and a front component 48, which substantially has a shell shape. Both components 48, 50 can be produced from sheet metal, for example, and can usually be joined to corresponding flanges 54 in order to form the bumper crossmember 10 designed as a box profile or support profile.

Moreover, in FIG. 4, the shell construction element in the form of a respective main longitudinal girder 20 is indicated, to which the respectively laterally allocated energy absorption component 12 is fixed by the intermediation of the corresponding counter element 24 (screw plate) and by the intermediation of a further flange element 21, which is latched into the corresponding main longitudinal girder 20 and is connected to it. Accordingly, the energy absorption component 12 runs horizontally, for example, towards the rear in the extension of the corresponding main longitudinal girder in the longitudinal direction of the vehicle. Finally, when FIGS. 3 and 4 are seen together, it can also be seen that the bumper crossmember 10 is supported from the front to the back in the vicinity of its lower end, in particular in the region of the flange 54, between the two components 48, 50, by the allocated support region 36 of the strengthening element 26, in particular the underside 40 of the strengthening element 26.

Figure 5:
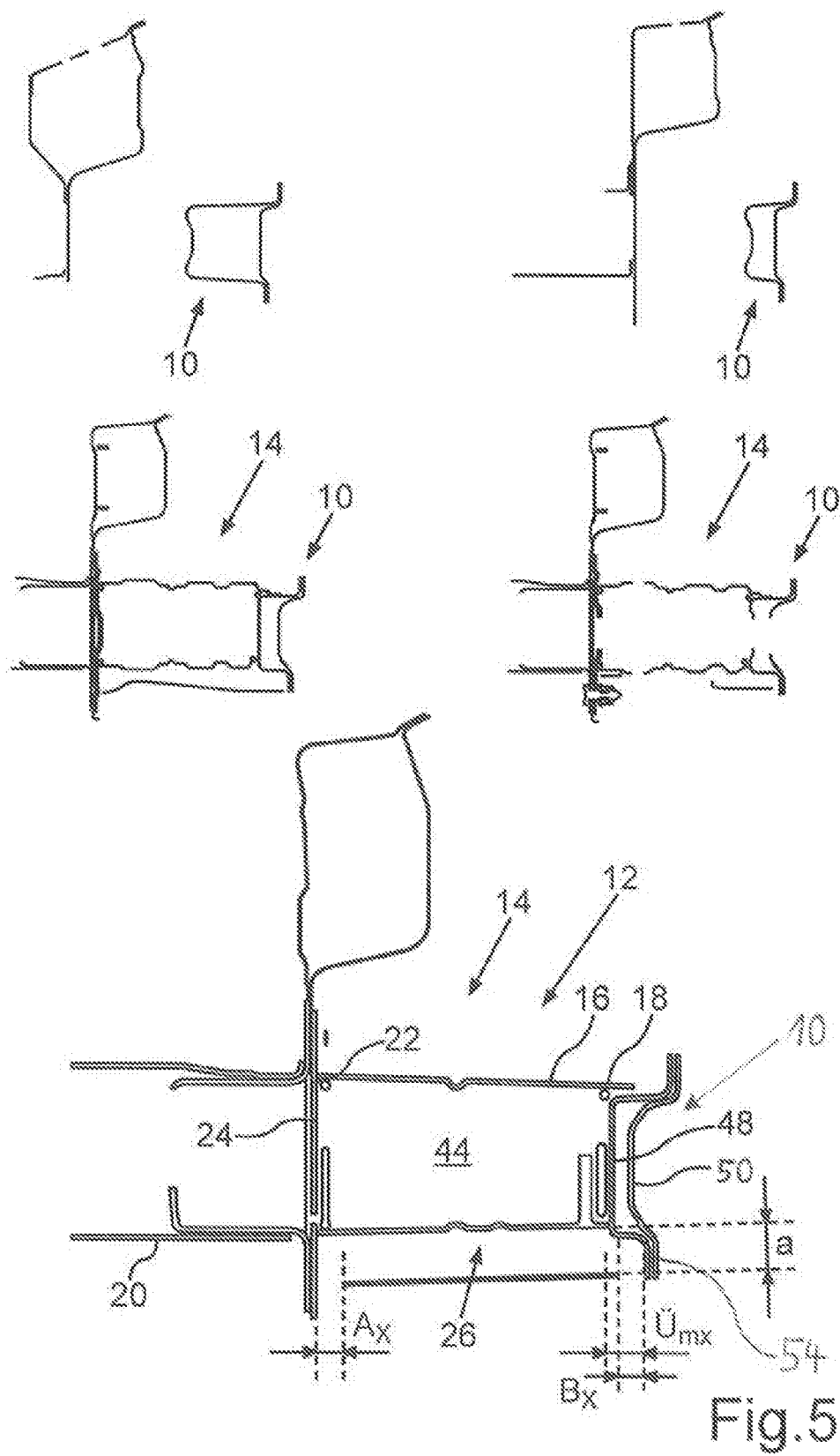
FIG. 5 shows various cuts through the arrangement of the bumper crossmember and the respective energy absorption components on the rear structure of the passenger vehicle.

In FIG. 5, a total of five sectional cut-out views of the arrangement of the energy absorption component 12 on the corresponding motor vehicle rear are depicted in respective cut-out views extending in the vertical direction of the vehicle or in the longitudinal direction of the vehicle, wherein these cut-out views are depicted in different positions in relation to the transverse direction of the vehicle (y-direction). The depiction in the top left here shows a cut-out view in the vehicle centre of the motor vehicle, in relation to the transverse direction of the vehicle (y-direction). The depiction in the top right shows a cut-out view in relation to the transverse direction of the vehicle just in front of one of the two energy absorption components 12.

The three lower depictions show respective cut-out views in the region of one of the energy absorption components 12, wherein these show various points of the cut-out views in relation to the transverse direction of the vehicle. Accordingly, the cut-outs convey the course through one of the two energy absorption components 12 starting from the depiction to the left in the centre, via the right in the middle and the bottom left, starting from the inside to the outside in relation to the transverse direction of the vehicle (y=450, y=475, y=510).

Figure 7:
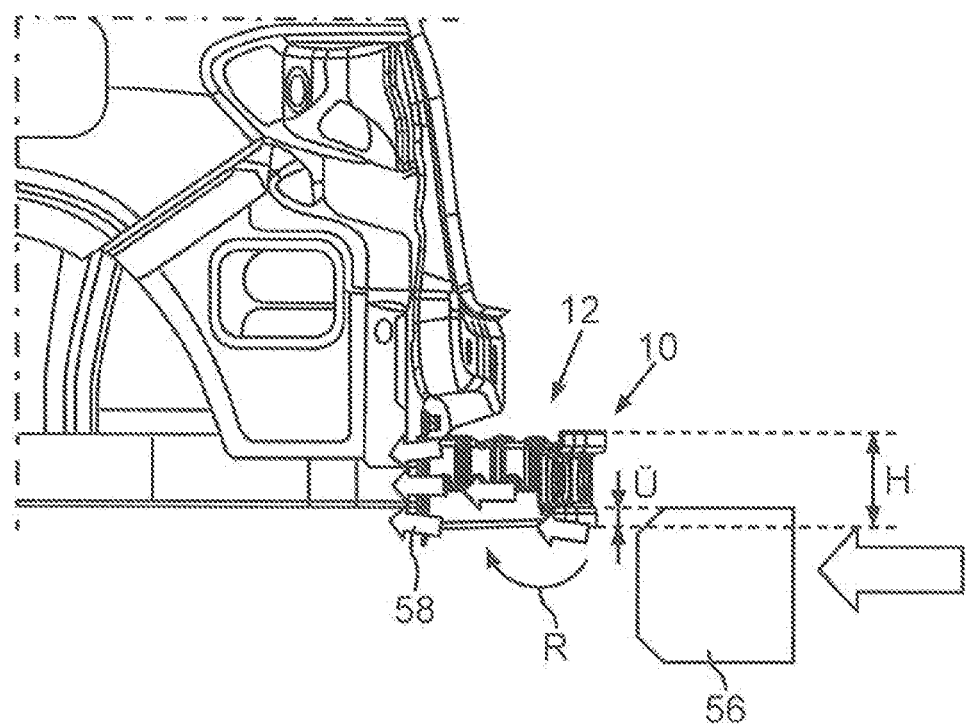
FIG. 7 is a side view of the arrangement of the bumper crossmember on the rear structure of the passenger vehicle by the intermediation of the respective energy absorption components, wherein once again a flux of force or respective load paths during the application of force caused by an accident are indicated by means of a barrier.

When viewing the lower three depictions together, in particular, it once again becomes clear that a support at a distance a apart below the longitudinal element 16 of the energy absorption element 14 is created by the strengthening element 26 and, in particular, by its underside 40, via which the bumper crossmember 10 is additionally supported in opposition to a rotational moment in the clockwise direction, such that the energy absorption element 14 does not prematurely buckle, break off or similarly collapse. Such a rotational moment emerges, in particular with minimal overlap U of the bumper transverse girder 10 with a crash barrier 56, as is indicated in FIG. 7 in a side view of the energy absorption component 12 on the motor vehicle rear. In particular, such a rotational moment emerges when the overlap U is less than half a height H or a height extension of the bumper crossmember 10. If an accident party, symbolized here by the crash barrier 56, accordingly impacts on the bumper crossmember 10 with its bumper or the corresponding components in such a constellation, then it can result in the rotational moment R indicated in FIG. 7, wherein this is intercepted by the arrangement of the strengthening element 26, such that forces acting substantially only in the longitudinal direction of the vehicle and indicated by arrows 58 are introduced into the shell construction of the motor vehicle, that is to say in particular via the respective main longitudinal girder 20.

Moreover, from the depiction of FIG. 5, the length of a maximum possible overlap $Ü_{mx}$ is indicated. If the maximum possible overlap is to be used, this means that the strengthening element 26 extends towards the back with its support region 36 up to the bumper crossmember 10 and thus a maximum overlap $Ü_{mx}$ between the length of the underside 40 of the strengthening element 26 and the lower longitudinal extension of the longitudinal element 16 in the longitudinal direction of the vehicle—seen from below in a projection—is present. In doing so, with a force supply causing an accident in the longitudinal direction of the vehicle, most favourable potential forces are received. In the present case, a minimum overlap is shown with the spacing $B_x$ in FIG. 5.

Figure 6:
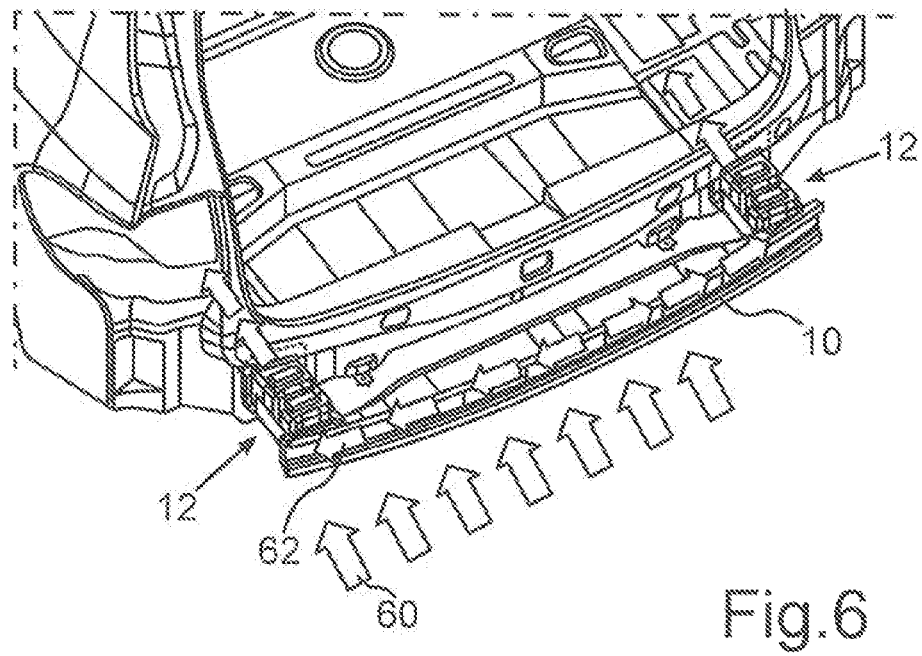
FIG. 6 is a further perspective view of the arrangement of the bumper on the rear structure of the passenger vehicle by the intermediation of the two energy absorption components, wherein a flux of force or respective load paths during the application of force caused by an accident is or are indicated as a result of a rear collision of an obstacle.

From FIG. 5, a distance apart $A_x$ between the front support region 38 of the strengthening element 26 or of its underside 40 in relation to the counter element 24, in the present flange of the flange plate, is depicted. In other words, the strengthening element 26 in the exemplary embodiment shown here ends at a distance apart $A_x$ in relation to the counter element 24. Moreover, in a further exemplary embodiment, a further distance apart $B_x$ between the rear support region 36 of the strengthening element 26 or its underside 40 in relation to the flange 54 is provided, which is here only indicated. This means that—as can be seen when viewed together with FIG. 6 in a perspective view from an angle above of the rear region of the arrangement of the energy absorption component 12—in the event of a crash, the energy absorption component 12 supplied first is supported against a twist resulting from an unfavourable overlap ratio Ü with the crash barrier 56, as shown in a side view with FIG. 7, and thus the force introduction is introduced in as good time as possible axially via the respective counter elements 24 on sides of the corresponding shell construction element 20, wherein the size and direction of the force introduced can be set by means of the variable axial distances $A_x$ and/or $B_x$, whereby the overall deformation of the passenger cabin in the longitudinal direction of the vehicle and in the horizontal direction of the vehicle is reduced as a result of lower inclinations for twisting or buckling of the respective energy absorption components 12 and the respective shell constructions. The point in time at which the strengthening element 26 comes into contact with the counter element 24, on one side, and the flange 54 of the bumper crossmember 10, on the other side, is thus influenced by the axial distances $A_x$ and/or $B_x$. The axial distances $A_x$ and/or $B_x$ can here optionally also be zero, consequently the strengthening element 26 is thus already in contact with or connected to the counter element 24, on one side, and the flange 54 of the bumper crossmember 10 on the other side without force supply causing an accident. In the present case, a minimum necessary overlap is shown with the distance $B_x$ in FIG. 5, since the underside 40 of the strengthening element 26 is, in any case, supposed to reach a part below the bumper crossmember 10 because otherwise a force supply would not come about in the event of a crash.

Overall, it can thus be seen how a construction box system is created in which the respective energy absorption elements can be complemented with respective energy absorption components by means of the strengthening elements, if this requires the respective vehicle stand height of the corresponding vehicle.

The invention claimed is:

1. An energy absorption component for a motor vehicle, comprising:
    an energy absorption element, wherein the energy absorption element comprises a longitudinal element with a first support region and a second support region, wherein the longitudinal element is supportable on a bumper crossmember of the motor vehicle by the first support region and wherein the longitudinal element is supportable on a shell construction element of the motor vehicle by the second support region; and
    a strengthening element which strengthens the energy absorption element;
    wherein the strengthening element is disposed on an outside of the longitudinal element and has a first support region and a second support region, wherein the strengthening element is supportable on the bumper crossmember via the first support region and is supportable on the shell construction element via the second support region, wherein an end of the first support region of the strengthening element is disposed apart from an end of the first support region of the longitudinal element by a first distance, and wherein an end of the second support region of the strengthening element is disposed apart from an end of the second support region of the longitudinal element by a second distance.

2. The energy absorption component according to claim 1, wherein the strengthening element has a leg and wherein the leg is connected to the longitudinal element of the energy absorption element.

3. The energy absorption component according to claim 1, wherein the strengthening element is U-shaped in cross-section at least across a longitudinal region and has two legs which are connected to the longitudinal element of the energy absorption element.

4. The energy absorption component according to claim 1, wherein the end of the second support region of the strengthening element is disposed apart from a counter element of the energy absorption element by a third distance.

5. The energy absorption component according to claim 1, wherein the first support region of the strengthening element is supportable on a flange on a lower end of the bumper crossmember.

6. An energy absorption element for a motor vehicle, comprising:
a longitudinal element with a first support region and a second support region, wherein the longitudinal element is supportable on a bumper crossmember of the motor vehicle by the first support region and wherein the longitudinal element is supportable on a shell construction element of the motor vehicle by the second support region; and
a fastening element on which a strengthening element can be fixed, wherein the strengthening element is disposable on an outside of the longitudinal element and has a first support region and a second support region, wherein the strengthening element is supportable on the bumper crossmember via the first support region and is supportable on the shell construction element via the second support region, wherein in an installed state of the strengthening element on the longitudinal element, an end of the first support region of the strengthening element is disposed apart from an end of the first support region of the longitudinal element by a first distance and an end of the second support region of the strengthening element is disposed apart from an end of the second support region of the longitudinal element by a second distance.

7. A strengthening element for an energy absorption component for a motor vehicle, comprising:
a first support region and a second support region, wherein the strengthening element is supportable on a bumper crossmember of the motor vehicle via the first support region and is supportable on a shell construction element of the motor vehicle via the second support region; and
a fastening element via which the strengthening element is disposable on an outside of a longitudinal element of an energy absorption element, wherein the longitudinal element has a first support region and a second support region, wherein the longitudinal element is supportable on the bumper crossmember of the motor vehicle by the first support region and wherein the longitudinal element is supportable on the shell construction element of the motor vehicle by the second support region;
wherein in an installed state of the longitudinal element on the strengthening element, an end of the first support region of the strengthening element is disposed apart from an end of the first support region of the longitudinal element by a first distance and an end of the second support region of the strengthening element is disposed apart from an end of the second support region of the longitudinal element by a second distance.

* * * * *